Figure 1:
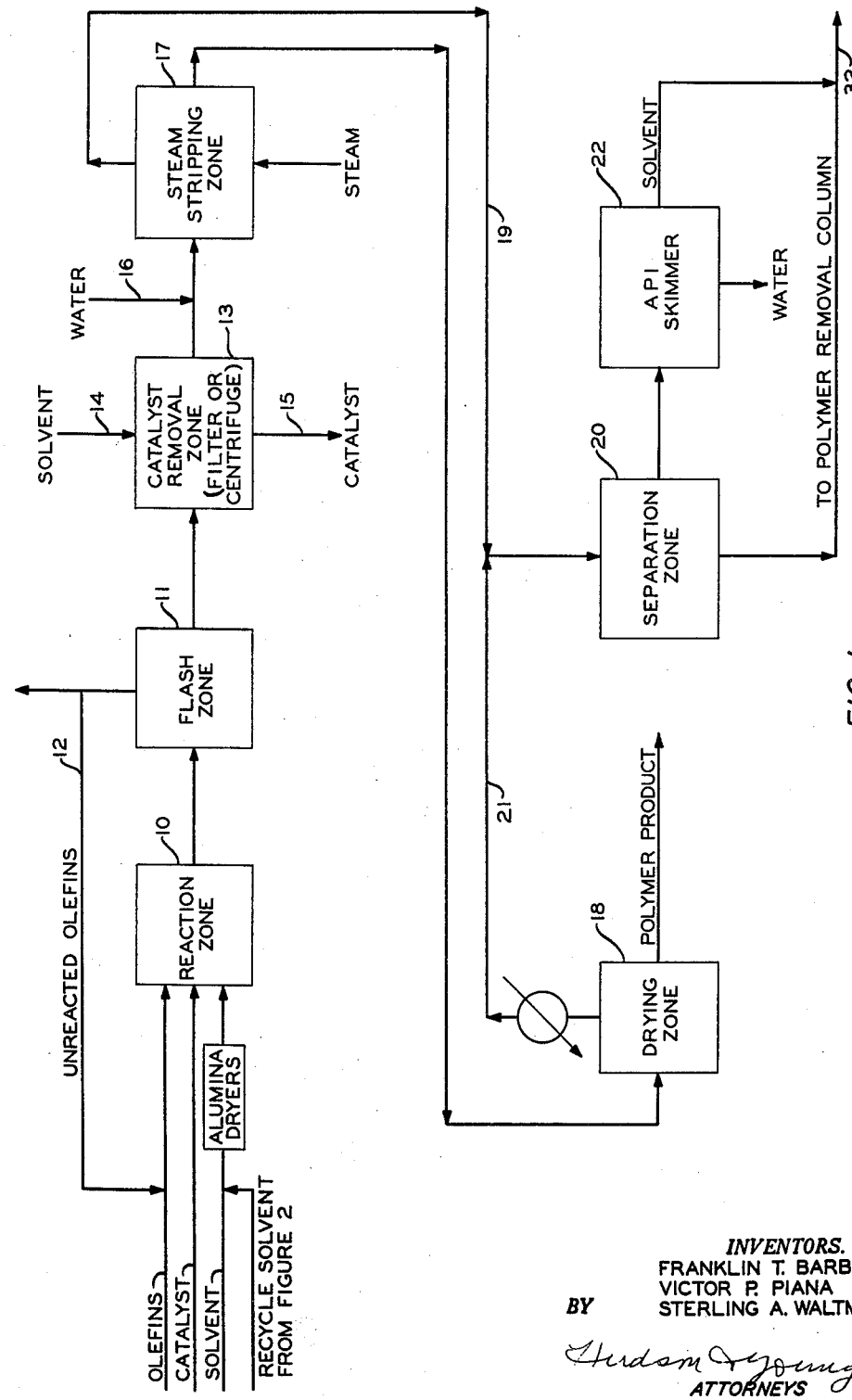

Dec. 25, 1962 F. T. BARBER ETAL 3,070,586
RECOVERY SOLVENT SYSTEM
Filed July 5, 1960 2 Sheets-Sheet 1

INVENTORS.
FRANKLIN T. BARBER
VICTOR P. PIANA
BY STERLING A. WALTMAN
ATTORNEYS

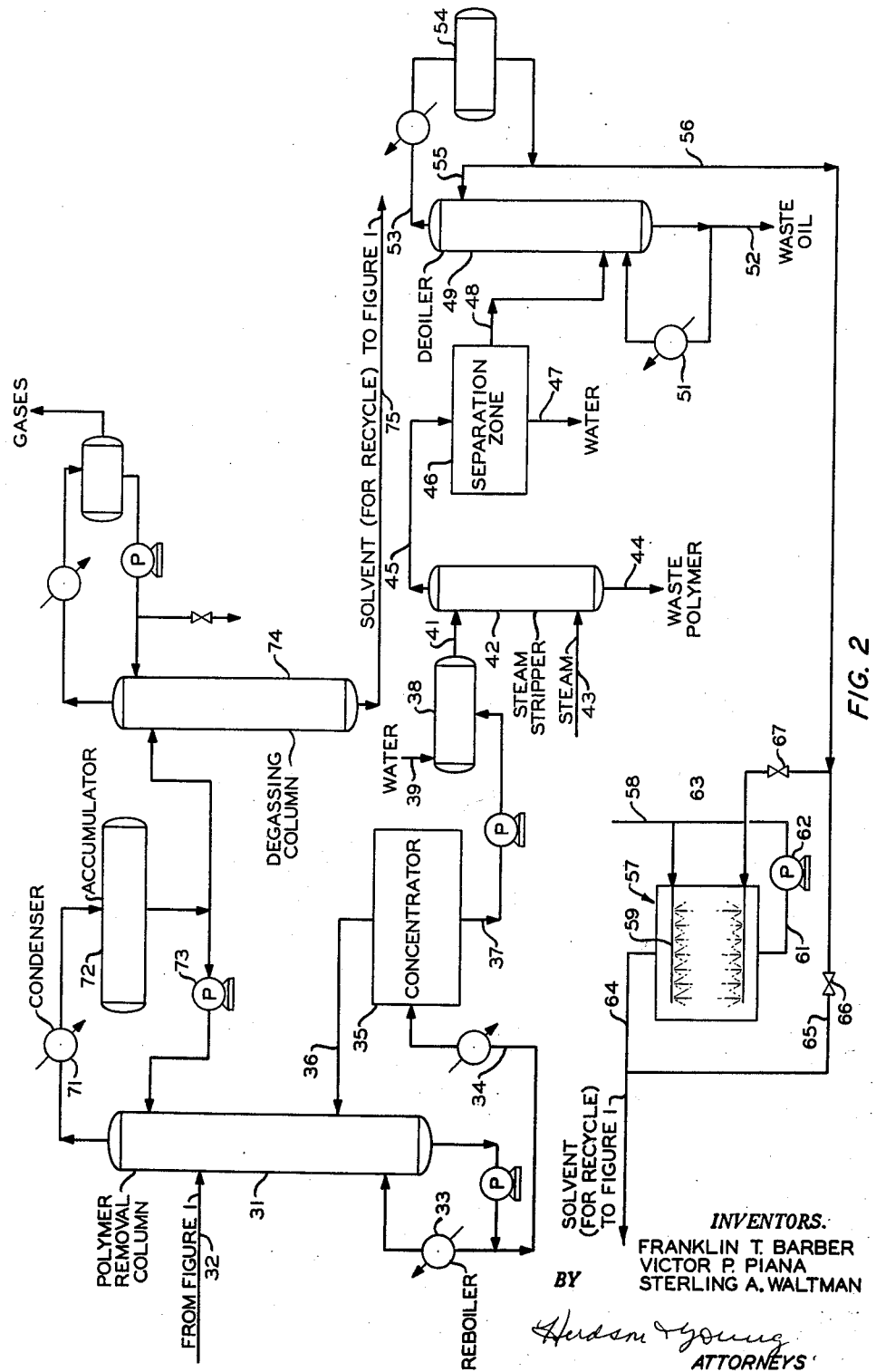

United States Patent Office 3,070,586
Patented Dec. 25, 1962

3,070,586
RECOVERY SOLVENT SYSTEM
Franklin T. Barber, Bartlesville, Okla., and Sterling A. Waltman and Victor P. Piana, Pasadena, Tex., assignors to Phillips Petroleum Company, a corporation of Delaware
Filed July 5, 1960, Ser. No. 40,675
8 Claims. (Cl. 260—93.7)

This invention relates to the recovery of solvent. In one of its aspects, the invention relates to the use of a deoiler column in a solvent recovery system. In another of its aspects, the invention relates to the utilization of a deoiler column prior to acid treating in recovering solvent. In a still further aspect of the invention, it relates to the utilization of a deoiler column, in combination with and prior to acid treatment in solvent recovery operations, with a polyolefin process. In another aspect, the invention relates to method of and means for removing certain high boiling fractions which accumulate in the solvent and are detrimental to the polyolefin process. In a still further aspect, the invention relates to a method of and means for treating solvent in the solvent recovery system of a polyolefin process to improve the quality of the solvent. In another aspect the invention relates to the utilization of a deoiler in a solvent recovery system while the acid treater is out of operation. In another aspect, the invention relates to a method of and means for reducing the consumption of acid in the acid treating operations in a solvent recovery system. A still further aspect of the invention is to prevent various catalyst poisons from building up in the solvent system. In another aspect, the invention relates to a polyolefin process wherein a deoiler is utilized in the solvent recovery system.

In a polyolefin process, such as is disclosed and claimed in U.S. Patent 2,825,721, issued March 4, 1958, J. P. Hogan and R. L. Banks for Polymer and Production Thereof, solvents and/or diluents can be utilized. As a result of the utilization of such solvents in the preparation of polyolefins, the solvent can become contaminated and it may become necessary to purify the contaminated solvent in order to maintain the efficient operation of the process.

Solvents and/or diluents to which this invention is applicable are hydrocarbon diluents, preferably paraffins and/or cycloparaffins having from 3 to 12, preferably 5 to 12, carbon atoms per molecule, and aromatic hydrocarbon diluents. Any hydrocarbon diluent which is relatively inert, non-deleterious, and liquid under the reaction conditions of the process can be utilized. Diluents that have been used successfully for the polymerization of ethylene, propylene and other olefins according to this invention include propane, isobutane, normal butane, normal pentane, isopentane, isooctane (2,2,4-trimethylpentane), cyclohexane, and methylcyclohexane. Normal hexane, the isohexanes such as neohexane and diisopropyl, normal heptane, the isoheptanes such as 2-methylhexane and triptane, normal octane, normal nonane, the isononanes, cyclopentane, methylcyclopentane, the dimethylcyclopentanes, and the dimethylcyclohexanes can also be used. The heavier paraffinic diluents have a higher solvent power for the product than do the lighter ones. However, the lighter paraffins are useful.

In order to accomplish the necessary purification of the contaminated solvent, a solvent purification section is provided to process the make-up and recycle streams from the polymerization process which contain solvent and remove the impurities (dissolved gases, soluble polymer, water, etc.). A solvent purification section comprises a polymer removal column for the removal of soluble polymer, a concentrator to concentrate the solvent kettle product from the polymer removal column, a steam stripper to inject stripping steam into the concentrated solvent, a separation zone where the water is removed from the stripped solvent, and an acid treater.

It has been found that various catalyst poisons build up in the system and reduce the efficiency of the operation. This is especially true when the acid treater is out of service, and, furthermore, when the acid treater is operating to remove these materials which are to be removed from the solvent to desirable extent, the acid consumption has increased up to 800 percent. These components are believed to be unsaturated hydrocarbons and other compounds which react with the acid and thereby consume it. The production of copolymers appears to increase the quantity of these materials in the solvent. It has also been found that the acid treater does not remove all of the impurities.

We have discovered that the solvent recovery system may be modified by utilizing a deoiler in combination with and prior to the acid treatment. This results in the reduction of build up of various catalyst poisons in the solvent system, the production of a solvent of higher quality over and above that attainable by acid treating alone, a reduction in the cost of acid treating operations by sharply reducing the consumption of acid, and more efficient plant operations in that the plant can continue to operate without serious reduction or loss of reaction during shutdown of the acid treater. We have further discovered that the deoiler removes impurities which the acid treater alone does not remove, and still further that the solvent recovery system can be maintained by utilizing the deoiler without the acid treater being utilized.

Accordingly, it is an object of the present invention to provide an improved solvent recovery system. It is another object of the invention to reduce the build-up of various catalyst poisons in the solvent system. It is a further object of the present invention to provide a recycle solvent of higher quality over and above that attainable by acid treating alone. It is a still further object of the invention to reduce the cost of operating the solvent recovery system. Another object of the invention is to reduce the consumption of acid in the acid treatment of solvent. Still another object of the invention is to provide for smoother plant operations by enabling the plant to continue to operate without serious reduction or loss of reaction during shutdown of the acid treater. Another object of the invention is to remove contaminants which accumulate in the solvent and are detrimental to the polymerization reaction, and which are not removed by acid treatment. Another object of the invention is to provide a polymerization process wherein a deoiler is utilized in the solvent recovery system.

Other objects, aspects and advantages of this invention will be apparent to one skilled in the art from a consideration of the disclosure, the drawing, and the appended claims.

In accordance with the invention, there is provided a method of and means for improving a solvent recovery system. Still further according to the invention, there is provided a deoiler column in combination with and prior to acid treatment in a solvent recovery system. Still further according to the invention, there is provided a deoiler column in combination with and prior to acid treatment in a solvent recovery system of a polyolefin process. Still further there is provided a polymerization process wherein a deoiler is utilized in the solvent recovery system.

Our invention is illustrated with reference to the drawings wherein, for purposes of illustration, it being understood that this invention is not limited thereto, FIGURE 1 is a diagrammatical arrangement of a polyolefin process and FIGURE 2 is a diagrammatical arrangement of a solvent recovery system.

In FIGURE 1, olefins, a suitable catalyst, and a suitable solvent are introduced into reaction zone 10. The product of reaction zone 10 is passed into and through flash zone 11, wherein unreacted olefins are removed and returned to reaction zone 10 by the way of line 12. The reaction product then passes into catalyst removal zone 13 wherein solvent is introduced through line 14, and catalyst is removed through line 15. The thus treated product is removed from catalyst removal zone 13, subjected to water injection at 16, and then subjected to steam stripping in steam stripping zone 17, and then dried in drying zone 18 and removed from the process. The overhead from steam stripping zone 17 passes through line 19 to separation zone 20, while the overhead from drying zone 18 passes through line 21 to separation zone 20. Water is removed from the solvent in separation zone 20 and passed to API skimmer 22 where any remaining solvent is separated. Solvent removed from separation zone 20 and API skimmer 22 is then passed to the polymer removal column 30 through the solvent return header (not shown).

The conditions of operation and catalyst which are employed in the polyolefin process here disclosed do not form a part of this invention. Suitable conditions of operation and catalyst can be selected from said U.S. Patent 2,825,721.

In FIGURE 2, feed to polymer removal column 31 comes from the solvent return header (not shown) through pipe 32. The solvent return header is a large pipeline with several smaller conduits bringing solvent from different sources to the large pipeline. For purposes of illustration and not in limitation of the invention, some of the sources of solvent for the solvent return header in a polyolefin process are:

(1) Solvent recovered in a solvent removal from steam stripping the polymer products.

(2) Solvent recovered from filter cake and centrifuge underflow stripping to remove the catalyst from the polymer.

(3) Solvent recovered from solvent treater regeneration.

(4) Solvent recovered from API skimmer and from hydrocarbon drain system.

(5) Solvent recovered from various knockout pots.

(6) Solvent recovered from flare header recovery system.

The polymer removal column is a distillation column utilizing a reboiler 33 for the source of heat. For the purification of cyclohexane, one of the solvents set forth in U.S. Patent 2,825,721, the polymer removal column is operated at 50 p.s.i.a, an overhead temperature of 262° F. and a bottom temperature of 265° F. From 0.1 to 1.5 weight percent polymer is removed from the solvent in the polymer removal column. Liquid contaminated solvent is removed from the polymer removal column 31 by pipe 34 and concentrated in concentrator 35. The vapors from concentrator 35 are returned to polymer removal column 31 by pipe 36. The concentrated solvent is removed from concentrator 35 through pipe 37 to jet injector 38, where water is injected into the solvent through line 39. The solvent is removed from jet injector 38 through pipe 41 to steam stripper 42 wherein stripping steam is injected into the solvent through line 43. The contaminated residue in steam stripper 42 is removed through line 44, while the stripped solvent is removed through line 45 to a separation zone 46 where the water is separated from the solvent and removed through line 47. The solvent is removed from separation zone 46 and passed by pipe 48 to deoiler 49.

The deoiler is also a distillation column utilizing a reboiler 51 for the source of heat. Again using cyclohexane as an example, the deoiler is operated at a temperature in the range of 175 to 200° F. and a pressure in the range of 2 to 4 p.s.i.g. Waste oil and contaminants are removed from deoiler 49 by way of pipe 52 while the deoiled solvent is removed from deoiler 49 by pipe 53 to accumulator 54. Part of the solvent is returned to deoiler 49 through pipe 55 as a reflux while the rest of the solvent is passed through pipe 56 to acid treater 57.

In acid treater 57, the solvent is washed with a suitable acid which can be sulfuric acid when the solvent is cyclohexane. Acid is admitted through pipe 58 and spray header 59 to the acid treater and is removed by pipe 61 and pump 62 and recycled by pipe 63 back to spray header 59. As the acid is consumed, fresh acid is added through pipe 58. The acid treated solvent is removed through line 64. The acid treated solvent can be subjected to a caustic wash, a water wash, and/or a filter such as sand, before being recycled to the solvent system.

By utilization of line 65 and valves 66 and 67, all of the solvent treated in deoiler 49 can be fed to and through acid treater 57, or part or all of the deoiled solvent can bypass the acid treater 57. This enables the plant to maintain smoother operations without serious reduction or loss of reaction during shutdown of the acid treater. The solvent recovery system can be operated with part of the deoiled solvent bypassing the acid treater, thus reducing the amount of solvent which flows through the acid treater, resulting in reduced acid consumption.

As used herein, the terms "solvent" and "diluent" are synonyms insofar as the chemical identity of the material used in this capacity is concerned.

The phloroglucinol test is an indication of higher olefin ($C_8$–$C_{10}$) content and their peroxides, and carbonyls resulting from peroxide decomposition which are catalyst poisons and consume sulfuric acid. Carbonyls not only increase acid consumption but adversely affect productivity in the polymerization reaction.

The deoiler removes higher 1-olefins of 8–10 carbon atoms, such as octene-1, which the acid treater does not remove. The acid treater alone converts octene-1 to a complex and is recycled with the cyclohexane back to the reactor where it is again reconverted to octene-1, so it would tend to build up in the polymerization system and adversely affect the reaction.

The overhead from polymer removal column 31 passes through condenser 71 to accumulator 72. Part of the liquid from accumulator 72 is returned to polymer removal column 31 as reflux by pump 73. The remainder of the liquid from accumulator 72 is degassed in degassing column 74. The degassed solvent is removed from degassing column 74 by way of line 75. All recycled solvent after being deoiled and/or degassed can be filtered through bauxite or alumina treaters to remove any remaining water and catalyst poisons prior to reuse in the polyolefin process.

Such auxiliary apparatus such as pumps, valves, regulators, flow controller, temperature and pressure recording and controlling apparatus and the like have not been shown on the drawing nor described in the specification for reasons of brevity and simplicity. The need for such apparatus, its installation and operation are well understood by those skilled in the art.

The operation and advantages of this invention are illustrated in the following example which is for purposes of illustration and not to be construed to limit the invention.

Contaminated solvent from the polymerization reaction was fed to the deoiler at 1.3 gallons per minute at a deoiler bottoms temperatures of 191° F. and a pressure of 2 p.s.i.g. The contaminated solvent feed had a PG No. of 950. The bottoms from the deoiler had a PG No. of 240,000. The overhead from the deoiler with a PG No. of 430 was fed to the acid treater. The effluent from the acid treater had a PG No. of 420.

The PG test consists of reacting 100 ml. of solvent with 10 ml. of concentrated HCl and 1 ml. of a solution of 10 percent phloroglucinol in isopropyl alcohol. The phloroglucinol test is an indication of higher olefin ($C_8$–$C_{10}$) content and their peroxides and carbonyls resulting from peroxide decomposition which are catalyst poisons and consume sulfuric acid.

In U.S. Patent 2,825,721 there is disclosed and claimed a process which comprises polymerizing at least one polymerizable olefin, at a polymerization temperature up to about 500° F., with a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst. In said patent, there is further disclosed and claimed a process which comprises polymerizing at least one aliphatic 1-olefin having from 2 to 8 carbon atoms per molecule and no chain branching nearer the double bond than the 4-position, in admixture with a hydrocarbon solvent which is inert and liquid under the polymerization conditions, at a polymerization temperature in the range 100° F. to 450° F., with a catalyst active for such polymerization and comprising, as the sole essential effective catalytic ingredients thereof, chromium oxide supported on at least one support component selected from the group consisting of silica, alumina, zirconia, and thoria, at least part of the chromium being in the hexavalent state at the initial contacting of hydrocarbon with catalyst.

Reasonable variation and modification are possible within the scope of the foregoing disclosure, the drawing, and the appended claims to the invention, the essence of which is that a solvent recovery system is improved by utilizing a deoiler, and more particularly by utilizing a deoiler in combination with and prior to acid treatment.

We claim:

1. A method of recovering solvent from a mixture comprising solvent, soluble polymers, gases and contaminants, comprising injecting said mixture into a first distillation column; removing from said first distillation column an overhead stream comprising gases and a major portion of the solvent contained in said mixture; separating the gases from said overhead stream to obtain a first product stream comprising purified solvent; removing from said first distillation column a kettle product comprising solvent, soluble polymers and contaminants; concentrating said kettle product by separating therefrom a portion of the solvent; returning the thus separated solvent into said first distillation column; passing the thus obtained concentrated kettle product into a steam stripping zone; injecting stripping steam into said steam stripping zone; removing from said steam stripping zone a first stream comprising waste polymers; removing from said steam stripping zone a second stream comprising solvent, water and a portion of said contaminants; passing said second stream into a separation and therein separating water from said second stream; passing said second stream from which water has been removed into a second distillation column; removing from said second distillation column a kettle product comprising a substantial portion of said contaminants; removing from said second distillation column an overhead stream; passing said overhead stream from said second distillation column to an acid treating zone and therein contacting said overhead stream from said second distillation column with acid to remove a portion of any remaining contaminants; and recovering from said acid treating zone a second product stream comprising purified solvent.

2. Apparatus for the recovery of solvent from a mixture comprising solvent, soluble polymers, gases and contaminants comprising in combination a first distillation column; means for introducing said mixture into said first distillation column; means for removing from said first distillation column an overhead stream comprising gases and a major portion of the solvent contained in said mixture, means for separating the gases from said overhead stream to obtain a first product stream comprising purified solvent; means for withdrawing from said first distillation column a kettle product comprising solvent, soluble polymers, and contaminants; means for concentrating said kettle product by separating therefrom a portion of the solvent contained therein; means for passing the thus separated solvent into said first distillation column; means for steam stripping the concentrated kettle product to obtain a first stream comprising waste polymers and a second stream comprising solvent, water, and contaminants; means for separating at least a portion of the water from said second stream; a second distillation column; means for introducing the second stream from which water has been removed into said second distillation column; means for withdrawing from said second distillation column a kettle product comprising a portion of said contaminants; means for removing from said second distillation column an overhead stream; means for acid treating the overhead stream from said second distillation column to remove at least a portion of any contaminants contained therein, and means for recovering purified solvent from said means for acid treating.

3. Apparatus for the recovery of solvent from a mixture comprising solvent, soluble polymers and contaminants comprising in combination, means for removing a portion of the solvent from said mixture; means for separating from the resulting concentrated mixture at least a portion of the soluble polymers contained therein; a distillation column; means for introducing into said distillation column the concentrated mixture from which at least a portion of the soluble polymers has been removed; means for withdrawing from said distillation column a kettle product comprising a substantial portion of said contaminants; means for withdrawing from said distillation column an overhead stream; means for acid treating said overhead stream to remove therefrom a portion of any contaminants contained therein; and means for recovering said purified solvent from said means for acid treating.

4. A method for the recovery of solvent in a mixture comprising solvent, soluble polymers and contaminants comprising the steps of injecting said mixture into a first distillation zone; removing from said first distillation zone an overhead stream comprising a major portion of the solvent contained in said mixture; removing from said first distillation zone a kettle product comprising solvent, soluble polymers and contaminants; separating at least a portion of the soluble polymers from said kettle product; passing into a second distillation zone the kettle product from which said portion of soluble polymers has been separated; removing from said second distillation zone a kettle product comprising substantially all of any remaining polymers and a substantial portion of the contaminants; removing from said second distillation zone an overhead stream, passing the overhead stream from said second distillation zone into an acid treating zone and therein contacting the overhead stream from said second distillation zone with acid to remove a portion of any remaining contaminants contained therein, and recovering purified solvent from said acid treating zone.

5. Apparatus for the recovery of solvent from a mixture comprising solvent, soluble polymers, gases and contaminants comprising in combination a first distillation column; means for injecting said mixture into said first distillation column; means for removing from said first distillation column an overhead product comprising solvent and gases; means for condensing said overhead product; means for returning a portion of the condensed overhead product to said distillation column as reflux therefor; a degasing column; means for injecting the remainder of said condensed overhead product to said degasing column; means for removing from said degasing column an overhead stream comprising any gases contained in said remainder of said condensed overhead product; means for removing from said degasing column a bottoms product comprising purified solvent; means for removing from said first distillation column a kettle product comprising solvent, soluble polymers and contaminants; means for separating a portion of the solvent from said kettle product and passing the thus separated solvent to said first distillation column; means for injecting water into the resulting concentrated kettle product; a steam stripper; means for introducing the concentrated kettle product containing water into said steam stripper; means for introducing steam into said steam stripper; means for withdrawing from said steam stripper a bottoms stream comprising waste polymers; means for withdrawing from said steam stripper an overhead stream comprising solvent, water, contaminants and any remaining polymers; means for separating water from said overhead stream from said stream stripper; a second distillation column; means for introducing into said second distillation column the overhead stream from said steam stripper from which water has been removed; means for withdrawing from said second distillation column a kettle product comprising contaminants and any remaining polymers; means for withdrawing from said second distillation column an overhead stream; means for treating the overhead stream from said second distillation column with acid to remove a portion of any remaining contaminants contained therein; and means for recovering purified solvent from said means for acid treating.

6. Apparatus in accordance with claim 5 further comprising means to bypass a portion of the overhead stream from said second distillation column around said means for acid treating.

7. A process comprising polymerizing at least one polymerizable olefin in a mixture with a hydrocarbon solvent which is inert and liquid under polymerization conditions, at a polymerization temperature and with a catalyst active for such polymerization; separating the catalyst from the polymerization reaction effluent; separating the remaining reaction effluent into a first stream comprising polymer and a second stream comprising solvent, soluble polymers and contaminants; introducing said second stream into a first distillation zone; removing from said first distillation zone an overhead stream comprising a major portion of the solvent contained in said second stream; removing from said first distillation zone a kettle product comprising solvent, soluble polymers and contaminants; steam stripping said kettle product to separate therefrom a substantial portion of the soluble polymers contained therein; separating the water from the steam stripped kettle product; introducing into a second distillation zone the steam stripped kettle product from which water has been removed; removing from said second distillation zone a kettle product comprising substantially all of any remaining polymers and a portion of the contaminants; removing from said second distillation zone an overhead stream; passing at least a portion of the overhead stream from said second distillation zone into said acid treating zone and therein contacting it with acid to remove a portion of any contaminants contained therein; and recovering purified solvent from said acid treating zone.

8. A process which comprises polymerizing in a polymerization zone at least one aliphatic 1-olefin having from 2 to 8 carbon atoms per molecule and no chain branching nearer the double bond than the 4-position, in admixture with a hydrocarbon solvent which is inert and liquid under the polymerization conditions, at a polymerization temperature in the range 100 to 450° F., with a catalyst active for such polymerization and comprising, as the sole essential effective catalytic ingredients thereof, chromium oxide supported on at least one support component selected from the group consisting of silica, alumina, zirconia, and thoria, at least part of the chromium being in the hexavalent state at the initial contacting of hydrocarbon with catalyst; withdrawing the reaction effluent from said polymerization zone; removing any catalyst contained in said reaction effluent; separating the remainder of the reaction effluent into a first stream comprising polymers and a second stream comprising solvent, soluble polymers and contaminants; introducing said second stream into a first distillation zone; removing from said first distillation zone an overhead stream comprising a major portion of the solvent contained in said second stream; removing from said first distillation zone a kettle product comprising solvent, soluble polymers and contaminants; steam stripping said kettle product to separate therefrom a substantial portion of the soluble polymers contained therein; separating the water from the steam stripped kettle product; introducing into a second distillation zone a steam stripped kettle product from which water has been removed; removing from said second distillation zone a kettle product comprising substantially all of any remaining polymers and a portion of the contaminants; removing from said second distillation zone an overhead stream, passing at least a portion of the overhead stream from said second distillation zone into said acid treating zone and therein contacting it with acid to remove a portion of any contaminants contained therein, and recovering purified solvent from said acid treating zone.

References Cited in the file of this patent

UNITED STATES PATENTS

| | | |
|---|---|---|
| 2,880,201 | Peters et al. | Mar. 31, 1959 |
| 2,951,880 | Wride | Sept. 6, 1960 |
| 2,953,557 | Wride et al. | Sept. 20, 1960 |